United States Patent [19]

Burkitt

[11] Patent Number: 5,268,150

[45] Date of Patent: Dec. 7, 1993

[54] CONCENTRATOR/EXTRACTOR APPARATUS HAVING A HYDROPHOBIC MEMBRANE

[75] Inventor: David T. Burkitt, Exeter, N.H.

[73] Assignee: Corning Incorporated, Corning, N.Y.

[21] Appl. No.: 809,864

[22] Filed: Dec. 18, 1991

[51] Int. Cl.⁵ ............................................. B01L 3/00
[52] U.S. Cl. ........................... 422/102; 159/DIG. 27; 202/168; 202/169; 422/99; 422/101
[58] Field of Search ............... 422/101, 102, 99; 159/DIG. 27; 202/168, 169; 203/DIG. 2

[56] References Cited

U.S. PATENT DOCUMENTS

| | | |
|---|---|---|
| 651,826 | 6/1900 | Coleman . |
| 744,795 | 11/1903 | Reese ............................ 202/168 |
| 938,279 | 10/1909 | Schultze ........................ 422/101 |
| 2,732,415 | 1/1956 | Klinge . |
| 3,098,800 | 12/1960 | Moran et al. .................. 422/101 |
| 3,441,481 | 6/1968 | Tobey ............................ 202/169 |
| 3,841,976 | 10/1974 | Scott et al. .................. 159/DIG. 27 |
| 4,006,062 | 2/1977 | Bhuchar et al. ............... 202/169 |
| 4,103,162 | 7/1978 | Iwamoto et al. ............... 250/343 |
| 4,238,451 | 12/1980 | Ciais et al. .................. 422/101 |
| 4,255,386 | 3/1981 | Schachter et al. .............. 202/169 |
| 4,265,713 | 5/1981 | Cheng .......................... 159/DIG. 27 |
| 4,419,187 | 12/1983 | Cheng et al. .................. 159/DIG. 27 |
| 4,511,435 | 4/1985 | Strohschein .................... 203/DIG. 2 |
| 4,545,862 | 10/1985 | Gore et al. .................... 159/DIG. 27 |
| 4,818,345 | 4/1989 | Jönsson ........................ 159/DIG. 27 |
| 4,953,694 | 9/1990 | Hayashi et al. ................ 159/DIG. 27 |
| 5,022,967 | 6/1991 | Stieg .......................... 203/DIG. 2 |
| 5,098,662 | 3/1992 | Killough ....................... 422/102 |

OTHER PUBLICATIONS

Scientific Apparatus for Environmental Testing and Drug Analysis (1989) The Burkitt Group (pp. 1-24).

Primary Examiner—Robert J. Warden
Assistant Examiner—Hien Tran
Attorney, Agent, or Firm—Brian R. Leslie; Stephen R. Christian

[57] ABSTRACT

A concentrator/extractor apparatus for employing solvent to extract a substance from a sample in order to increase the concentration of the substance in less time than prior art apparatuses is disclosed. The disclosed apparatus, and kits including the disclosed apparatus and compatabile components, is provided with a sample containing body in which a hydrophobic membrane is utilized to prevent the sample liquid from migrating to the concentrator portion of the combination extractor/-concentrator apparatus. Solvents having densities greater than, or lower than, the sample may be used to process such samples by the disclosed apparatus.

37 Claims, 5 Drawing Sheets

CONCENTRATOR/EXTRACTOR APPARATUS HAVING A HYDROPHOBIC MEMBRANE

FIELD OF THE INVENTION

This invention relates generally to the field of laboratory ware and particularly to laboratory apparatus employing solvent to extract a substance from a sample in order to increase the concentration of the substance in that solvent.

BACKGROUND OF THE INVENTION

Historically, extraction and concentration of substances from test samples, such as leachates or environmental pollutants in water, soils for organic analysis, oil-soluble vitamins in grains, plasticizers in polymers, and drug related substances in blood serum, were carried out in separate extraction and concentration apparatus. Recently, it has become more common within the art to use combined extraction/concentration apparatus to reduce processing time, and to reduce the amount of solvent vapor released into the atmosphere when transferring the extractant from the extractor apparatus to the concentrator apparatus.

Extraction and concentration of a sample in a typical combination extractor/concentrator is conducted by passing a suitable solvent through a test sample repeatedly in order for the solvent to combine with any substance that may be present within the sample. After the sample has been adequately exposed to the solvent, a valve usually located along a tube connecting a sample containing body and a concentrator apparatus, is closed and the extract is concentrated by distilling away the solvent to render a concentrate of the substance contained in the solvent. The concentrate is then available for analysis.

When using solvent having a density lesser than the density of the sample in which it is being passed, a typical combination extractor/concentrator apparatus has an insert, or other means, within the sample containing body for introducing the solvent from below the sample in order for it to rise therethrough. Although such apparatuses are designed to accommodate the differing densities of the solvent and the sample, care must be taken to ensure that the proper levels of solvent and sample are maintained so the solvent and/or the sample does not back flow through the apparatus due to unequal head pressures.

Figure 1:
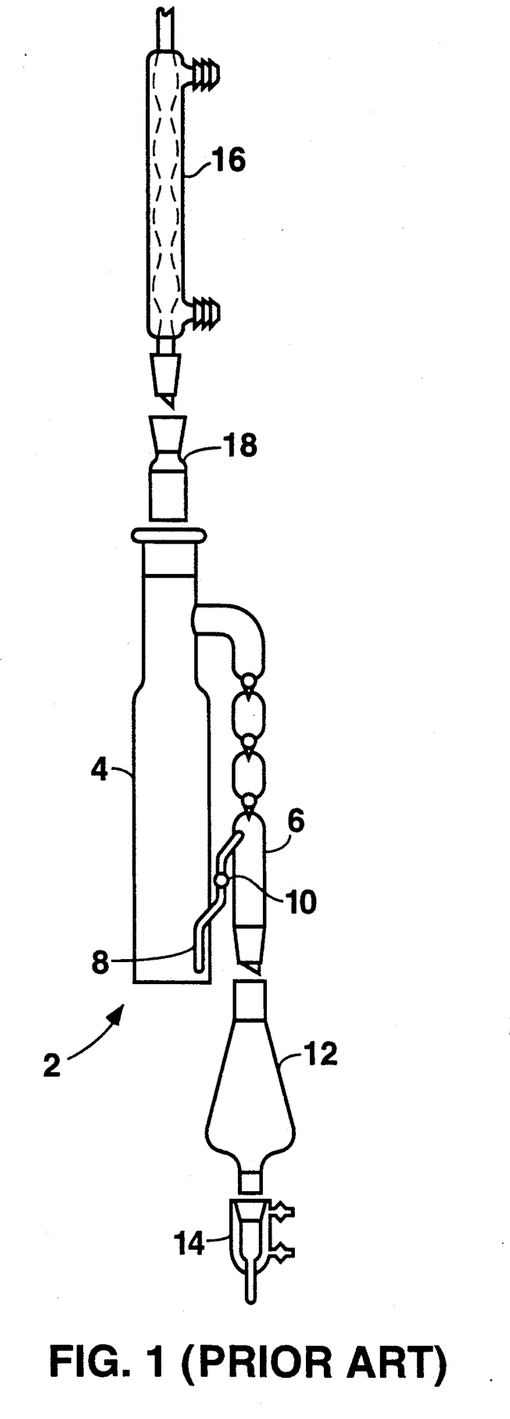
FIG. 1 is an exploded front view of a prior art combination extractor/concentrator apparatus for use with solvent having a density greater than the density of the sample to be processed.
Figure 2:
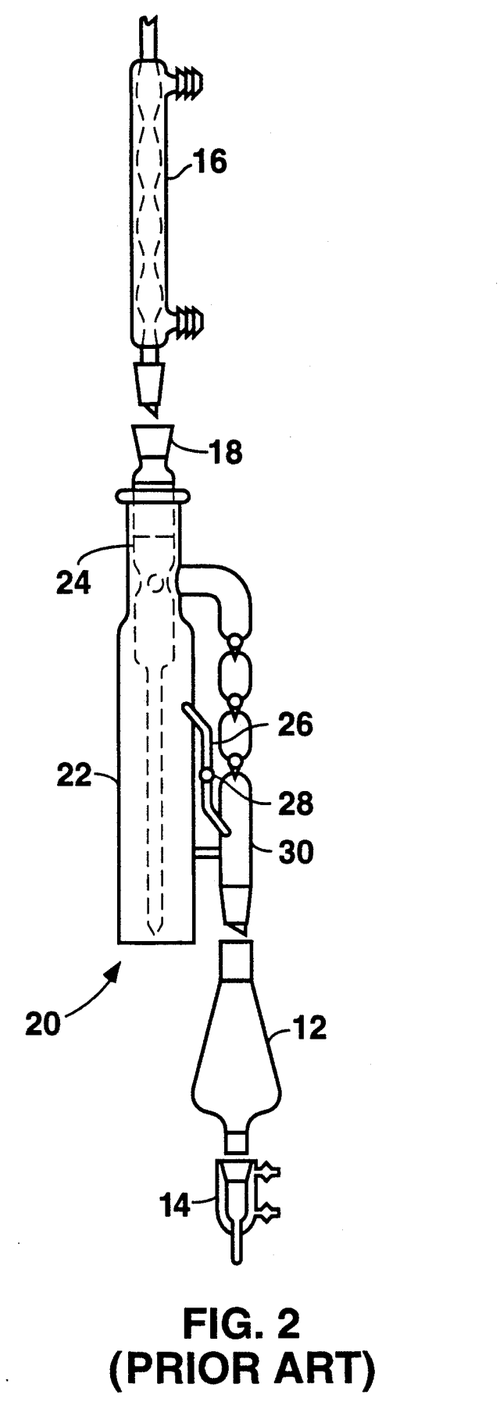
FIG. 2 is an exploded front view of a prior art combination extractor/concentrator apparatus for use with solvent having a density lesser than the density of the sample to be processed.

Representative prior art combination extractor/concentrator apparatuses are shown in FIGS. 1 and 2. The apparatus shown in FIG. 1 is for use with solvent having a density greater than the density of the sample being processed. The apparatus shown in FIG. 2 is for use with solvent having a density lesser than the density of the sample being processed. The apparatus shown in FIG. 2 can be easily distinguished from the apparatus in FIG. 1 by the insert within the sample container body.

A shortcoming with prior art apparatuses includes the need for an elevated solvent connecting tube. An elevated connecting tube is required to balance the equation pertaining to hydraulic head pressures within the apparatus: sample height × sample density = solvent height = solvent density. Notwithstanding that an apparatus has been designed to achieve a balance within the above equation, the technician operating the apparatus is not relieved of the burden of ensuring that the respective amounts of solvent and sample present within the apparatus are within the design parameters of the apparatus.

A further shortcoming with prior art apparatuses is the need to have a relatively large pool of solvent underlying, or overlying, the sample liquid for achieving a hydraulic balance within the apparatus. In addition to the expense of obtaining large volumes of solvents, certain solvents may pose environmental threats if released to the atmosphere in large quantities.

There is also a long standing economic need within the art for the apparatus to perform extractions and concentrations within shorter time periods as compared with the time periods required with conventional, or more recently available combination extractor/concentrator apparatuses.

Therefore, there is a continuous need within the art, for extractor/concentrator apparatuses that operate efficiently and quickly with relatively small amounts of solvent.

OBJECTS OF THE INVENTION

An object of this invention is to provide extractor/concentrator apparatus that requires a reduced amount of solvent for processing samples as compared to previously known apparatuses.

An object of this invention is to provide extractor/concentrator apparatus that requires a reduced amount of time for processing samples as compared to previously known apparatuses.

Another object of this invention is to provide extractor/concentrator apparatus that can be easily operated and cleaned by laboratory technicians.

A further object of this invention is to provide extractor/concentrator apparatus that are suitable for use with solvents having densities greater than, or lesser than, the densities of the samples being processed.

A yet further object of this invention is to provide extractor/concentrator apparatus and apparatus kits that are compatible with conventional laboratory glassware such as Allihn condensers, Kuderna-Danish flasks, jacketed concentrators, Snyder distillation columns and readily available tubing and fittings.

SUMMARY OF THE INVENTION

The above mentioned objects, as well as others, are achieved by providing apparatus and kits of selected components. The apparatus and kits include structures having a hydrophobic membrane to prevent the sample liquid from migrating to the concentrator portion of combination extractor/concentrtor apparatus.

More specifically the invention includes a sample containing body for incorporation in an extractor/concentrator apparatus suitable for use with solvents having a density greater than the sample to be processed. The sample containing body defines a volumetric cavity and the sample containing body further includes an open ended upper portion shaped to accommodate accessory components, a vapor return port proximate to the upper portion of the sample body, and an open ended lower portion shaped to accommodate a hollow outlet fitting. The outlet fitting has a sample body engaging end and an outlet end. The outlet fitting is configured to position and retain a hydrophobic membrane in such a manner as to fluidly partition the volumetric cavity and the outlet end of the hollow outlet fitting. A distillation column that is engageable with the solvent return port is provided.

The invention also includes a sample containing body for incorporation in an extractor/concentrator apparatus suitable for use with solvents having a density lesser than the density of the sample to be processed. The sample containing body defines a volumetric cavity and the sample containing body has a lower portion having an inlet port proximate thereto and an upper portion having an outlet port shaped to accommodate a hollow outlet fitting. The outlet fitting has a sample body engaging end and an outlet end, the outlet fitting is configured to position and retain a hydrophobic membrane in such a manner as to fluidly partition the volumetric cavity and the outlet end of the hollow outlet fitting. A solvent reservoir column having an open ended upper portion for accommodating accessory components, a vapor return port and a connection tube connectable to the inlet port of the sample containing body. A distillation column having at least two ends, one end being connectable to the vapor return port of the solvent reservoir column and at least one end shaped to accommodate accessory components is provided.

Kits including components summarized above, as well as various complementary conventional laboratory ware such as condensers, distillation columns, concentrators, fittings, and flasks are also disclosed.

DETAILED DESCRIPTION OF THE DRAWINGS

A representative prior art combination extractor/concentrator for use with solvents having a density greater than the sample to be processed is shown in FIG. 1 of the drawings. Extractor/concentrator 2 makes use of a sample containing body 4 having a distillation column 6. Distillation column 6 is attached to the upper region of body 4, as well as being connected to the lower region of body 4 by connecting tube 8. Connecting tube 8 has a flow control valve 10 for controlling the flow of solvent extract. Kuderna-Danish flask 12 is fitted to distillation column 6 and jacketed concentrator 14 is fitted to Kuderna-Danish flask 12. Allihn condenser 16, making use of an optional adaptor 18, is fitted to body 4.

To use the apparatus shown in FIG. 1, extraction is performed by introducing a solvent and a sample to be processed into sample containing body 4. The sample is typically an aqueous solution possibly containing a substance of interest. Valve 10 is opened allowing the solvent to pass through connecting tube 8 into flask 12 and concentrator 14 via distillation column 6. A sufficient amount of heat is introduced to concentrator 14 causing the solvent to boil. Solvent vapor travels upward through the distillation column eventually returning to the upper region of body 4. The vapor continues to rise into condenser 16 where it is chilled causing it to condense and return to the main portion of body 4. Upon returning to the main portion of body 4, the solvent passes through the contained sample and continues the above described cycle for a predetermined amount of time, or until a sufficient amount of the sought after substance has been extracted from the sample. The concentration process is performed after the extraction process by closing valve 10. Distillation of the solvent is continued by continuing to apply heat to concentrator 14 until there is a small volume of solvent containing a high concentration of sought after substance in concentrator 14. The solvent boiled off during the concentration process is returned to body 4 as in the extraction process described above with the exception that valve 10, in the closed position, prevents the solvent from passing into distillation column 6. Such prior art apparatus requires a careful design to establish the levels of the solvent and the sample is required to maintain a solvent pool in the sample containing body for holding and preventing emulsions from crossing over into the concentrator portion of the apparatus.

A representative prior art combination extractor/concentrator for use with solvents having a density lesser than the sample to be processed is shown in FIG. 2 of the drawings. Extractor/concentrator 20 makes use of a sample containing body 22 having a distillation column 30. Distillation column 30 is attached to the upper region of body 22 and is connected to the middle region of body 22 by connecting tube 26. Connecting tube 26 has a flow control valve 28 for controlling the flow of solvent extract. Kuderna-Danish flask 12 is fitted to distillation column 30 and jacketed concentrator 14 is fitted to Kuderna-Danish flask 12. Allihn condenser 16, making use of an optional adaptor 18, is fitted to tubular insert 24, which in turn, is fitted to body 22.

Figure 3:
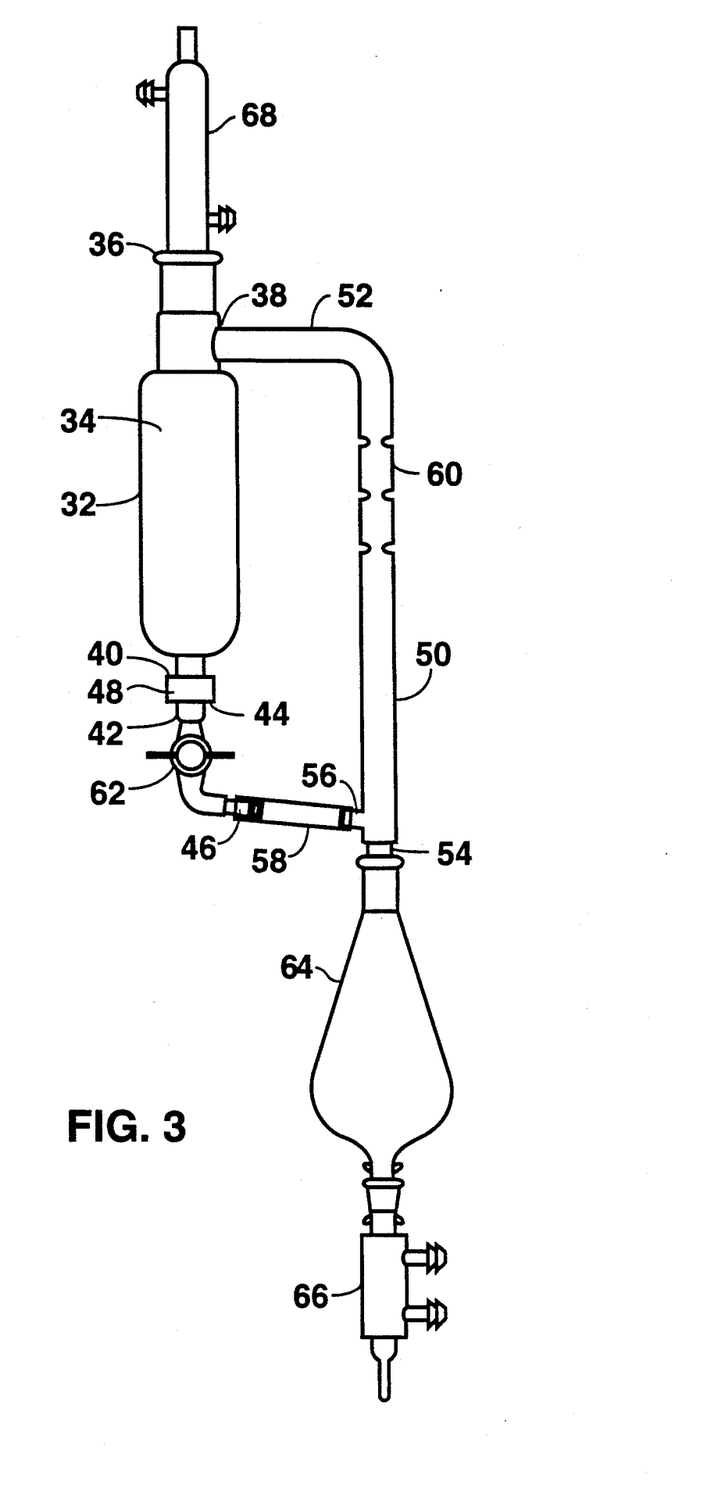
FIG. 3 is a front view of an embodiment of the disclosed extractor/concentrator apparatus having a Snyder distillation column, and is suitable for use with solvents having a density greater than the density of the sample to be processed.

The operation of extractor/concentrator 20 is much the same as extractor/concentrator 2 shown in FIG. 1, except that solvent is introduced below the sample contained in body 22 via insert 24. This allows the solvent to rise through the sample, due to the solvent having a lesser density than the sample. The solvent, upon rising upward through the sample collects sought after substances or impurities, passes through connecting tube 26 into distillation column 30 and eventually finds its way to flask 12 and concentrator 14 where it is vaporized and returned to body 22 via insert 24 after being cooled in condenser 16. It is especially important to maintain appropriate levels of solvent and sample in this type of apparatus to prevent the flow of the sample into distillation column 30, yet allow the solvent, carrying any sought after substances or impurities, to rise through the sample and pass into distillation column 30 by way of connecting tube 26. An embodiment of the present invention is revealed in FIG. 3 of the drawings The apparatus shown in FIG. 3 is suitable for use with solvent having a density greater than the sample that is to be processed. A sample containing body 32 provides a cavity 34 for retaining a sample liquid. The body 32 has an open ended upper portion 36 shaped and sized to accommodate accessory components. Upper portion 36 additionally has an inlet port 38 located near the open ended upper portion of body 32. Body 32 additionally has an open ended lower portion 40 shaped to accommodate a hollow outlet fitting 42.

Hollow outlet fitting 42 has a sample body engaging end 44 and an outlet end 46. Outlet fitting 42 is configured to position and retain hydrophobic porous membrane 48 in such a manner as to fluidly partition cavity 34 from outlet end 46 of outlet fitting 42. Hydrophobic membrane 48 allows solvent to pass therethrough, yet will not allow a significant amount of water from the sample liquid to pass therethrough. Therefore, the apparatus allows for the use of a lesser quantity of solvent because large pools of solvent to balance head pressures, and to retain emulsions in the sample body, are no longer required. Hydrophobic membranes made from a material incorporating polytetrafluoroethylene (PTFE) have been found to be very effective in achieving the desired results of letting solvent pass, while retaining the sample usually consisting of a relative large portion of water or an aqueous solution. Commercially available membranes found to be particularly suitable, are marketed by Gelman Company under the term Zefluor. The typical dimensions of the membrane range from 10 to 50 millimeters in diameter with a thickness ranging from 0.1 to 5.0 microns with a pore size ranging from 0.2 to 5.0 microns, depending on the sample being processed. The preferred dimensions of a hydrophobic membrane for use in apparatus using solvent heavier than water, such as the embodiment shown in FIG. 3, has a diameter of 25 millimeters and a pore size of 2 microns.

Figure 4:
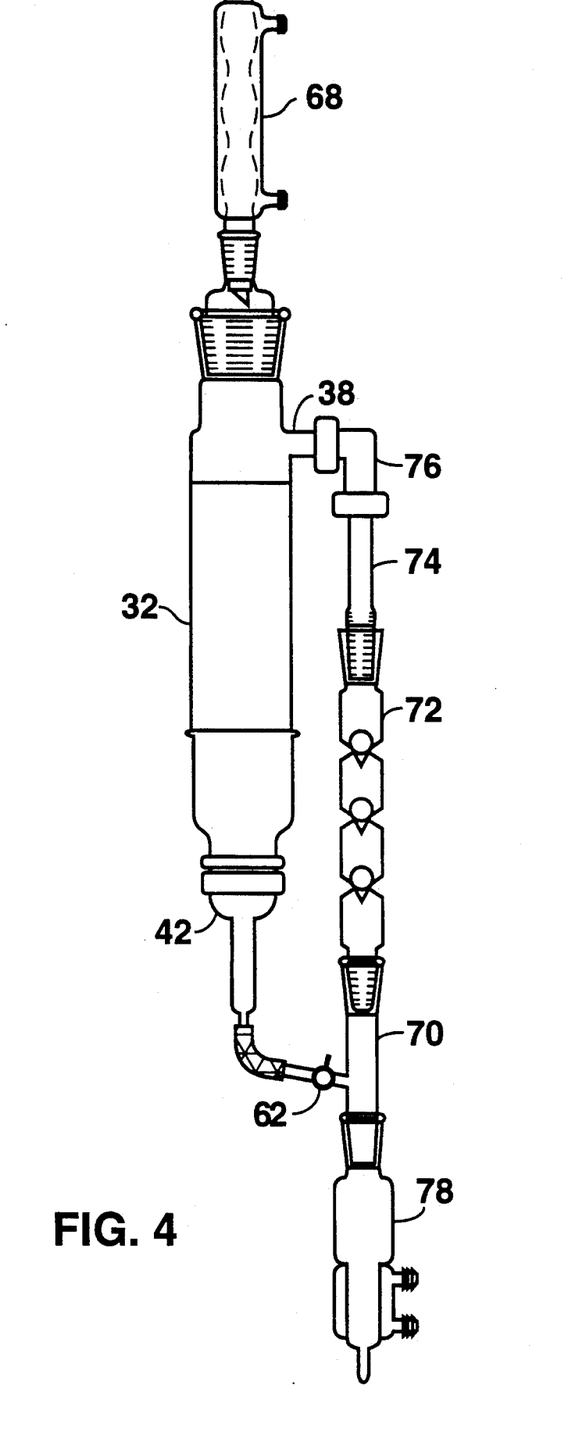
FIG. 4 is a front view of an embodiment of the disclosed extractor/concentrator apparatus having a Snyder distillation column and is suitable for use with solvents having a density greater than the density of the sample to be processed.
Figure 6:
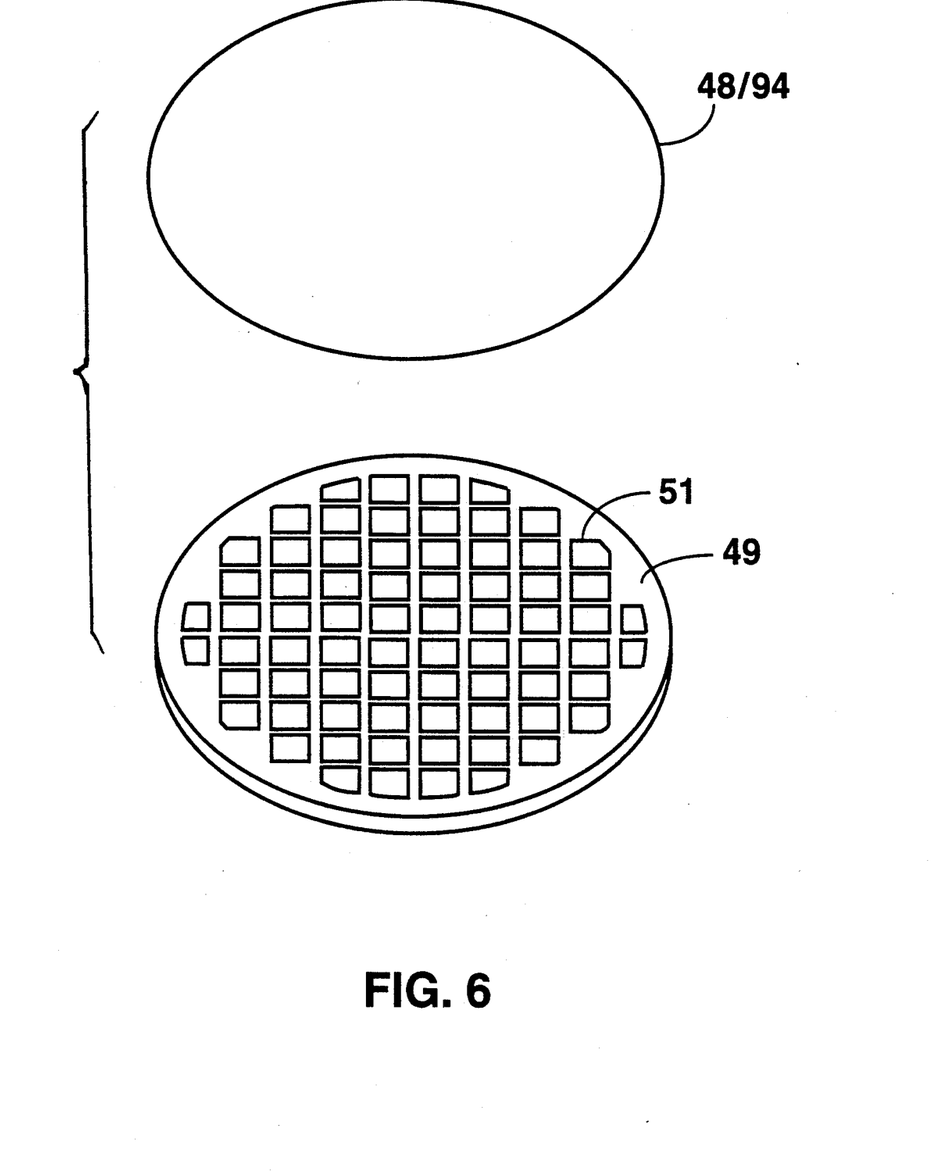
FIG. 6 is a perspective view of a representative hydrophobic membrane having a circular shape and a compatible membrane support grid.

Such a disc-shaped hydrophobic membrane and an optional membrane support grid 49 suitable for use in the embodiment of the apparatus shown in FIGS. 3 and 4 is shown in FIG. 6 of the drawings. Membrane support grid 49 is sized to be installed downstream and proximate to membrane 48 to prevent membrane 48 from being ruptured when supporting the weight of relatively heavy aqueous samples. Membrane support grid 49 may be made of stainless steel or other other material impervious to samples and solvents to be processed within the apparatus. Support grid 49 includes a plurality of passages 51 appropriately sized and spaced to permit liquids to flow through the support grid while also providing adequate structural support to membrane 48. Passages 51 having a nominal diameter of at least 0.1 millimeter and an edge to edge spacing of at least 1.0 millimeter have been found to perform well.

Returning to FIG. 3, outlet fitting 42 makes use of an annular ridge in sample body engaging end 44 for receiving and retaining hydrophobic membrane 48 against outlet port 40 of sample containing body 32 by way of threaded means or clamping means. Because there are numerous designs that may be employed for fluidly sealing and retaining a disc-shaped element to a container, the particular membrane retaining design chosen is not critical to practicing the disclosed invention.

Outlet fitting 42, can be sized and configured to retain optional drying material therein for removing any water that may be entrained in the solvent that may pass through membrane 48. Typically, a plug of glass wool combined with a selected amount of anhydrous sodium sulfate will remove any such entrained water from the solvent as the solvent makes its way through the apparatus.

Distillation column 50 has at least two ends, 52 and 54. End 52 is engagable with return port 38 and may be removably connected or permanently fused thereon. A connecting port 56 may be provided on distillation column 50 for accepting a connecting means such as flexible connecting hose 58. A glass tubing is removably connected to outlet port 46 and optional connecting port 56 may be used in lieu of flexible tubing. Additionally, a tubing adaptor (not shown) having a connecting port thereon may be fitted to distillation column end 54 in order to provide a fluid connection between outlet end 46 and distillation column 50 in lieu of connecting port 56 on distillation column 50. Stopcock, or flow control valve 62, is shown in FIG. 3 as being conveniently incorporated in outlet fitting 42 down stream of membrane 48. However, the purpose of valve 62 is to control the flow of fluid from cavity 34 into the concentrator portion of the apparatus including column 50, therefore valve 62 may be located at any position between cavity 34 and distillation column 50 in order to achieve the desired results. In lieu of using a valve, a tubing clamp (not shown in the drawings) could be used to deform connecting tube 58 thereby allowing control of the flow of fluid from the sample containing body 34 into column 50.

In order to form a complete apparatus, or kit, a conventional Kuderna-Danish flask 64 is shown fitted to distillation end 54, a conventional jacketed concentrator 66 is shown fitted to flask 64, a conventional Allihn condenser 68 is shown fitted to open end 36 of container body 32, and distillation column 50 is shown with Snyder type valves 60. However, a plain tube distillation column, or another type of distillation column, may be used in lieu of column 50. Furthermore, any of the conventional labware mentioned can be replaced by other labware widely known and used within the art without exceeding the scope of the invention.

An alternative embodiment of the disclosed apparatus for use with solvents having a density greater than the density of the sample to be processed and making more use of conventional accessory labware is shown in FIG. 4. This embodiment differs from the embodiment shown in FIG. 3 in that flow control valve 62 is now located on intermediate distillation tube 70, which is connected to a standard Snyder column 72. Snyder column 72 is joined to tubing 74 which is connected to fitting 76 which is connected to return port 38.

Processing of samples in the above disclosed apparatus for use with solvents having a density greater than the density of the samples being processed is carried out much the same way as the prior art apparatus. That is, solvent is cycled through the sample in the sample containing body by opening the flow control valve thereby allowing the solvent to flow through the hydrophobic membrane and into the concentrator portion of the apparatus where the solvent is heated, vaporized, and is returned to the sample containing body after being cooled and condensed in the condenser. The solvent is cycled through the sample for a predetermined amount of time or until the sample has been adequately exposed to the solvent. The flow control valve is then closed and the substance bearing solvent is heated and distilled in the concentrator portion until a desired amount of concentrate remains in the concentrator. The concentrate is then removed for analysis.

Figure 5:
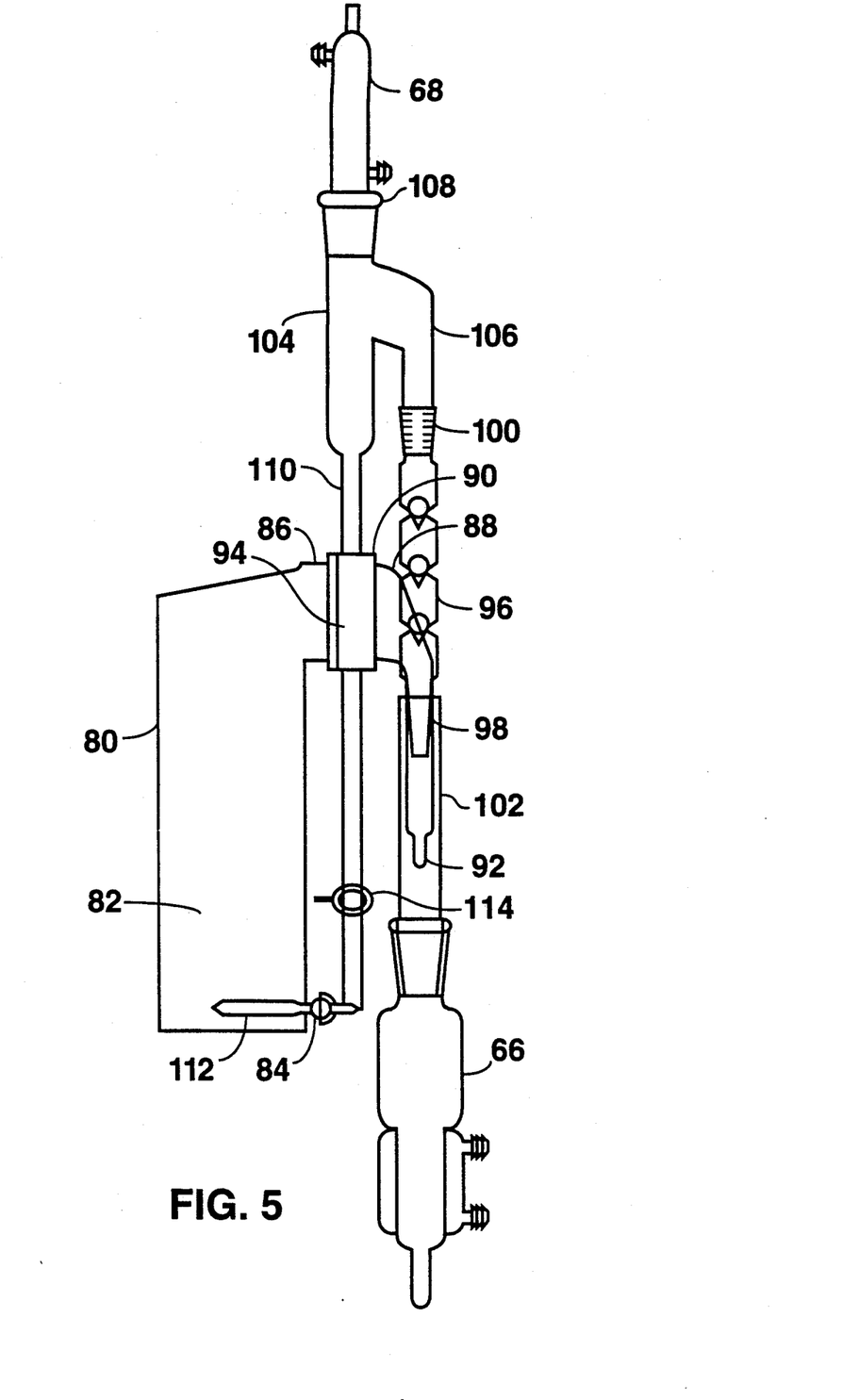
FIG. 5 is a front view of an embodiment of the disclosed extractor/concentrator apparatus having a Snyder distillation column, and is suitable for use with solvents having a density lesser than the density of the sample to be processed.

An embodiment of the disclosed invention for use with solvents having a density lesser than the density of sample to be processed is shown in FIG. 5. Sample containing body 80 defines a volumetric cavity 82 for retaining samples to be processed. The lower portion of body 80 has an inlet port 84 and the upper portion of body 80 has an outlet port 86 for accommodating outlet fitting 88. Outlet fitting 88 has a body engaging end 90 and an outlet end 92. Outlet fitting is configured to position and retain a hydrophobic membrane 94 in such a manner as to fluidly partition volumetric cavity 82 and outlet end 92. Outlet fitting 88 makes use of an annular ridge in sample body engaging end 90 for receiving and retaining hydrophobic membrane 94 against outlet port 86 of sample containing body 80 by way of threaded means or clamping means.

Hydrophobic membrane 94 allows solvent to pass therethrough, yet will not allow a significant amount of water from the sample liquid to pass therethrough. Thus the embodiment of the apparatus shown in FIG. 5 offers the same features and advantages as the embodiments shown in FIGS. 3 and 4. Namely, the incorporation of hydrophobic membrane 94 allows for the use of a lesser quantity of solvent as compared to conventional combination apparatus because large pools of solvent to balance head pressures, and to retain emulsions, are no longer required. Hydrophobic membranes made from a material incorporating polytetrafluoroethylene (PTFE) have been found to be very effective in achieving the desired results of letting solvent pass while retaining the sample usually consisting of a relative large portion of water or an aqueous solution. Commercially available membranes found to be particularly suitable, are marketed by Gelman Company under the term Zefluor. The typical dimensions of the membrane range from 10 to 50 millimeters in diameter with a thickness ranging from 0.1 to 5.0 microns with a pore size ranging from 0.2 to 5.0 microns, depending on the sample being processed. The preferred dimensions of a hydrophobic membrane for use in apparatus using solvent heavier than water, such as the embodiment shown in FIG. 3, has a diameter of 25 millimeters and a pore size of 2 microns.

Such a disc-shaped hydrophobic membrane and an optional membrane support grid 49 suitable for use in the embodiment of the apparatus shown in FIG. 5 is shown in FIG. 6 of the drawings. Membrane support grid 49 is sized to be installed downstream and proximate to membrane 94 to prevent membrane 94 from being ruptured. Membrane support grid 49 may be formed of any suitable material such as stainless steel or other material impervious to the samples and solvents to be used within the apparatus. Support grid 49 includes a plurality of passages 51 appropriately sized and spaced to permit liquids to flow through the support grid while also providing adequate structural support to membrane 48. Passages 51 having a nominal diameter of at least 0.1 millimeter and an edge to edge spacing of at least 1.0 millimeter have been found to perform well.

A distillation column 96 having two ends 98 and 100 is shown connected to an intermediate distillation tube 102, which in turn is connected with outlet end 92 of outlet fitting 88. Distillation tube 102, can be sized and configured to retain optional drying material therein for removing any water that may be entrained in the solvent that may pass through membrane 94. Typically, a plug of glass wool combined with a selected amount of anhydrous sodium sulfate will remove any such entrained water from the solvent as the solvent makes its way through the apparatus.

Distillation column 96 in this particular embodiment is a Snyder-type distillation column, however a plain distillation column, or any other distillation column, may be used in lieu thereof. Distillation tube 102 is optional in that outlet end 92 may be directly connected to distillation column 96. A combination flask and jacketed concentrator 66 is fitted to distillation tube 102. Solvent reservoir 104 has a vapor return port 106 that is fitted to distillation column end 100. Solvent reservoir 104 has an open ended upper portion for receiving accessory components such as condenser 68. Connection tube 110 fluidly connects solvent reservoir 104 and inlet port 84 of sample body 80. Solvent injection nozzle 112 extending into the lower portion of sample body 80 from inlet port 84 may be used to better disperse the solvent within volumetric cavity 82. Stopcock, or flow control valve 114, is shown located on connection tube 110. The exact position of control valve 114 is not critical as it provides a convenient means for controlling the flow of solvent into and out of body 80. For example control valve 114 could be located along outlet end 92.

Processing of samples in the above disclosed apparatus for use with solvents having densities lesser than the density of the samples being processed is carried out much the same way as the prior art apparatus having tubular inserts, as shown in FIG. 2, with the exception that the solvent is introduced to the sample in sample containing body 80 by opening flow control valve 114 allowing the solvent to flow from solvent reservoir 104 to sample body 80. The solvent rises through the sample in the sample containing body 80 and flows through hydrophobic membrane and into the concentrator portion of the apparatus, including column 96, tube 102 and concentrator 66, where the solvent is heated and vaporized and is returned to the solvent reservoir after being cooled and condensed in condenser 68. The solvent is cycled through the sample for a predetermined amount of time or until the sample has been adequately exposed to the solvent. Flow control valve 114 is then closed and the substance bearing solvent is heated and distilled in the concentrator portion until a desired amount of concentrate remains in concentrator 66. The concentrate is then removed for analysis.

Although the present invention has been shown and described with respect to detailed embodiments thereof, it will be understood by those skilled in the art that various changes in the form and detail thereof may be made without departing from the spirit and scope of this invention as claimed.

We claim:
1. An extractor/concentrator apparatus comprising:
   a) a sample containing body defining a volumetric cavity, the sample containing body having an open ended upper portion shaped to accommodate accessory components, a vapor return port located adjacent to the upper portion of the sample body, and an open ended lower portion shaped to accommodate a hollow outlet fitting;
   b) the outlet fitting having a sample body engaging end and an outlet end, the outlet fitting being configured to position and retain a hydrophobic membrane in such a manner as to fluidly partition the volumetric cavity of the sample containing body and the outlet end of the hollow outlet fitting;

c) a distillation column having two ends, one end being connected to the vapor return port, the remaining end being shaped to accommodate accessory components;

d) a hydrophobic membrane, positioned within the outlet fitting, for allowing a solvent to pass therethrough while not allowing a significant amount of water from a sample liquid to pass therethrough; and e) a conveying means for conveying the solvent through the hydrophobic membrane to the distillation column.

2. An apparatus as claimed in claim 1 wherein a flow control valve is positioned fluidly in line between the volumetric cavity of the sample containing body and the distillation column.

3. An apparatus as claimed in claim 1 wherein a solvent dehydration means for removing water entrained in a liquid solvent is positioned fluidly in line between the hydrophobic membrane and the distillation column.

4. An apparatus as claimed in claim 1 wherein the distillation column comprises a Snyder distillation column.

5. An apparatus as claimed in claim 1 further comprising:
a) a concentrator means connected to one of the ends of the distillation column; and
b) a condenser means connected to the open ended upper portion of the sample containing body.

6. An apparatus as claimed in claim 1 wherein the hydrophobic membrane comprises polytetrafluoroethylene.

7. The apparatus as claimed in claim 1 wherein a membrane support grid is in Juxtaposition to the hydrophobic membrane.

8. The apparatus as claimed in claim 1 wherein the hydrophobic membrane has a thickness ranging from 0.2 to 5.0 millimeters, has an outside diameter ranging from 10 to 50 millimeters, and contains pores sized between 0.2 and 5.0 microns.

9. The extractor/concentrator apparatus as claimed in claim 1 wherein the outlet fitting is constructed and arranged to retain a solvent dehydration means for removing water entrained in a liquid solvent.

10. An extractor/concentrator apparatus comprising:
a) a sample containing body defining a volumetric cavity, the sample containing body having a lower portion having an inlet port and an upper portion having an outlet port shaped to accommodate a hollow outlet fitting;
b) the outlet fitting having a sample body engaging end and an outlet end, the outlet fitting being configured to position and retain a hydrophobic membrane in such a manner as to fluidly partition the volumetric cavity and the outlet end of the hollow outlet fitting;
c) a solvent reservoir column having an open ended upper portion shaped to accommodate accessory components, a vapor return port, and a connection tube connected to the inlet port of the sample containing body;
d) a distillation column having at least two ends, one end being connected to the vapor return port of the solvent reservoir column and at least one end being shaped to accommodate accessory components;
d) a hydrophobic membrane, positioned within the outlet fitting, for allowing a solvent to pass therethrough while not allowing a significant amount of water from a sample liquid to pass therethrough; and e) a conveying means for conveying the solvent through the hydrophobic membrane to the distillation column.

11. An apparatus as claimed in claim 10 wherein a flow control valve is positioned fluidly in line between the solvent reservoir and the volumetric cavity of the sample containing body.

12. An apparatus as claimed in claim 10 wherein a solvent dehydration means for removing water entrained in a liquid solvent is positioned fluidly in line between the hydrophobic membrane and the distillation column.

13. An apparatus as claimed in claim 10 wherein the distillation column comprises a Snyder distillation column.

14. An apparatus as claimed in claim 10 further comprising:
a) a concentrator means connected to one of the ends of the distillation column; and
b) a condensor means connected to the open ended upper portion of the solvent reservoir column.

15. The apparatus as claimed in claim 10 wherein the hydrophobic membrane comprises polytetrafluoroethylene.

16. The apparatus as claimed in claim 10 wherein a membrane support grid is in Juxtaposition to the hydrophobic membrane.

17. The apparatus as claimed in claim 10 wherein the hydrophobic membrane has a thickness ranging from 0.2 to 5.0 millimeters, has an outside diameter ranging from 10 to 50 millimeters, and contains pores sized between 0.2 and 5.0 microns.

18. The apparatus as claimed in claim 10 wherein the inlet port of the sample containing body comprises a solvent injection nozzle protruding into the volumetric cavity.

19. The extractor/concentrator apparatus as claimed in claim 10 wherein the outlet fitting is constructed and arranged to retain a solvent dehydration means for removing water entrained in a liquid solvent.

20. An extractor/concentrator kit comprising:
a) a sample containing body defining a volumetric cavity, the sample containing body having an open ended upper portion shaped to accommodate accessory components, a vapor return port proximate to the upper portion of the sample body, and an open ended lower portion shaped to accommodate a hollow outlet fitting;
b) the outlet fitting having a sample body engaging end and an outlet end, the outlet fitting being configured to position and retain a hydrophobic membrane in such a manner as to fluidly partition the volumetric cavity of the sample containing body and the outlet end of the hollow outlet fitting;
c) a distillation column having at least two ends, one end being connectable to the vapor return port, the remaining end being shaped to accommodate accessory components;
d) a hydrophobic membrane, positioned within the outlet fitting, for allowing a solvent to pass therethrough while not allowing a significant amount of water from a sample liquid to pass therethrough; and e) a conveying means for conveying the solvent through the hydrophobic membrane to the distillation column.

21. An extractor/concentrator kit as claimed in claim 20 wherein a flow control valve is positionable fluidly in line between the volumetric cavity of the sample containing body and the distillation column.

22. An extractor/concentrator kit as claimed in claim 20 wherein a solvent dehydration means for removing water entrained in a liquid solvent is positionable fluidly in line between the hydrophobic membrane and the distillation column.

23. An extractor/concentrator kit as claimed in claim 20 wherein the distillation column comprises a Snyder distillation column.

24. An extractor/concentrator kit as claimed in claim 20 further comprising:
   a) a concentrator means connectable to one of the ends of the distillation column; and
   b) a condenser means connectable to the open ended upper portion of the sample containing body.

25. The extractor/concentrator kit as claimed in claim 20 wherein the hydrophobic membrane comprises polytetrafluoroethylene.

26. The apparatus as claimed in claim 20 wherein a membrane support grid is in Juxtaposition to the hydrophobic membrane.

27. The apparatus as claimed in claim 20 wherein the hydrophobic membrane has a thickness ranging from 0.2 to 5.0 millimeters, has an outside diameter ranging from 10 to 50 millimeters, and contains pores sized between 0.2 and 5.0 microns.

28. The extractor/concentrator apparatus as claimed in claim 20 wherein the outlet fitting is constructed and arranged to retain a solvent dehydration means for removing water entrained in a liquid solvent.

29. An extractor/concentrator kit comprising:
   a) a sample containing body defining a volumetric cavity, the sample containing body having a lower portion having an inlet port and an upper portion having an outlet port shaped to accommodate a hollow outlet fitting;
   b) the outlet fitting having a sample body engaging end and an outlet end, the outlet fitting being configured to position and retain a hydrophobic membrane in such a manner as to fluidly partition the volumetric cavity and the outlet end of the hollow outlet fitting;
   c) a solvent reservoir column having an open ended upper portion shaped to accommodate accessory components, a vapor return port, and a connection tube fluidly connectable to the inlet port of the sample containing body;
   d) a distillation column having at least two ends, one end being connectable to the vapor return port of the solvent reservoir column and at last one end being shaped to accommodate accessory components;
   d) a hydrophobic membrane, positioned within the outlet fitting, for allowing a solvent to pass therethrough while not allowing a significant amount of water from a sample liquid to pass therethrough; and
   e) a conveying means for conveying the solvent through the hydrophobic membrane to the distillation column.

30. An extractor/concentrator kit as claimed in claim 29 wherein a flow control valve is positional fluidly in line between the solvent reservoir and the volumetric cavity of the sample containing body.

31. An extractor/concentrator kit as claimed in claim 29 wherein a solvent dehydration means for removing water entrained in a liquid solvent is positionable fluidly in line between the hydrophobic membrane and the distillation column.

32. An extractor/concentrator kit as claimed in claim 29 wherein the distillation column comprises a Snyder distillation column.

33. An extractor/concentrator kit as claimed in claim 29 further comprising:
   a) a concentrator means fluidly connected to one of the ends of the distillation column; and
   b) a condenser means fluidly connected to the open ended upper portion of the solvent reservoir column.

34. The extractor/concentrator kit as claimed in claim 29 wherein the hydrophobic membrane comprises polytetrafluoroethylene.

35. The apparatus as claimed in claim 29 wherein a membrane support grid is in Juxtaposition to the hydrophobic membrane.

36. The apparatus as claimed in claim 29 wherein the hydrophobic membrane has a thickness ranging from 0.2 to 5.0 millimeters, has an outside diameter ranging from 10 to 50 millimeters, and contains pores sized between 0.2 and 5.0 microns.

37. The extractor/concentrator kit as claimed in claim 29 wherein a solvent injection nozzle is fluidly connectable to the inlet port of the sample containing body.

* * * * *